W. S. JARBOE.

Improvement in Round Belt-Couplings.

No. 131,879.

Patented Oct. 1, 1872.

UNITED STATES PATENT OFFICE.

WALTER S. JARBOE, OF NEW YORK, N. Y., ASSIGNOR TO HIMSELF AND
J. F. WOOD, OF BOSTON, MASSACHUSETTS.

IMPROVEMENT IN ROUND-BELT COUPLINGS.

Specification forming part of Letters Patent No. 131,879, dated October 1, 1872.

*To all whom it may concern:*

Be it known that I, WALTER S. JARBOE, of the city, county, and State of New York, have invented an Improvement in Means for Coupling Driving-Bands, of which the following is a specification:

This invention relates to that class of couplings employed in connecting the ends of driving-bands, such as are used on grooved pulleys and the like. Its object is to enable the two sections of such a coupling to be held snugly together, and without liability to separation or displacement by the most severe and irregular usage to which the same may be subjected during the working of the band. To this end, the invention consists in combining a coupling-section, having a threaded bolt and a coupling nut or section, with the two ends to be joined of the band, in such manner that the torsion of the band, exerted in a direction corresponding to that of the threads of the bolt and nut, shall tend to screw the former into the latter, and thereby effectually secure the result desired.

Figure 1:
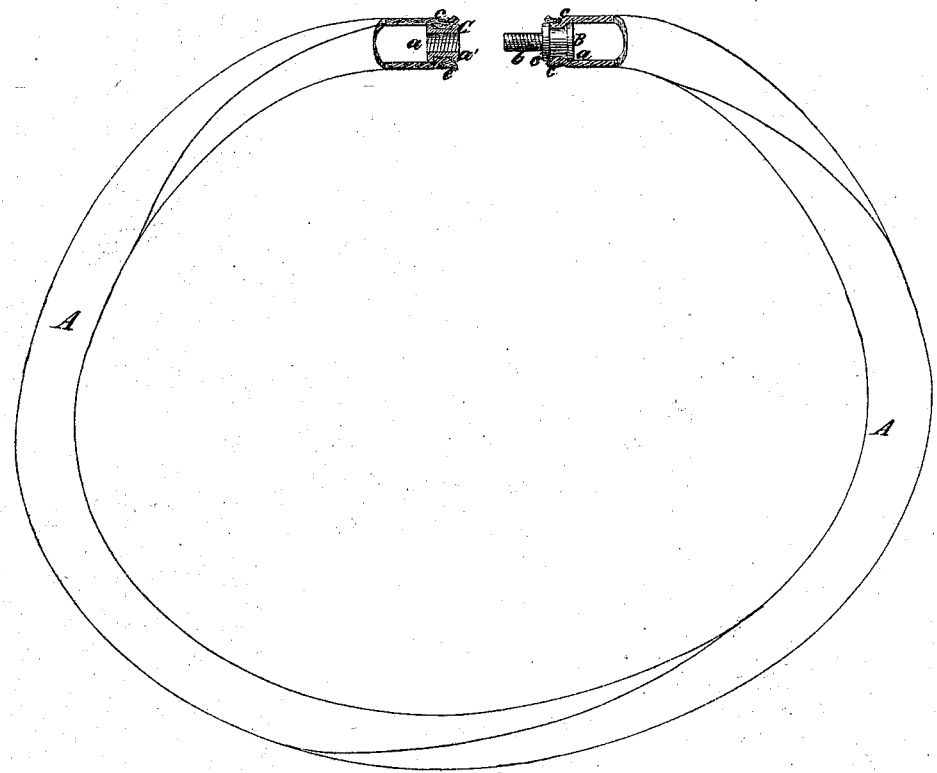
Figure 2:

Figure 1 is a side view and partial section of a band furnished with a coupling made and applied according to my invention, the two sections being represented as separated the better to show their construction and attachment to the ends to be joined of the band. Fig. 2 is a detached view of the ends of the band with the coupling attached, and partially screwed home to unite the ends.

A is the "band," which may be of circular or other appropriate cross-section, as distinguished from the broad flat form of the "belt" commonly used on flat-faced pulleys, the band being of India rubber or of any other material suitable for the purpose or ordinarily applied to the same or analogous uses. The band may be hollow or tubular, as indicated in Fig. 1, and in any case is so formed centrally in each of the ends to be connected as to receive one of the sections B C of the coupling, these sections being fitted within the hollow ends of the bands, as shown at $a$ in the figure last mentioned, and each provided with an annular or circumferential groove in such manner that the adjacent or surrounding part $c$ of the end of the band, being tightly wound with wire or some equivalent thereof, will be forced into the groove, and the sections be thereby firmly and securely attached to the ends, just indicated, of the band. The section B is furnished with a male screw or threaded stem, $b$, of a size corresponding to the internal diameter of the other section, C, which constitutes the nut or female screw for the reception of the threaded stem $b$ of the section B.

In order to connect the two ends of the band—or, in other words, to put the coupling into use—the band is first twisted in a direction opposite to that in which the screw $a$ turns while being screwed into the nut C. This being done to such a degree that a portion of the torsional strain thus induced in the band will remain after the two ends of the latter are brought together, the threaded bolt or screw of the section B is screwed into the nut or section C until the shoulders $a'$ $c'$ of the two sections come against each other, and thus limit the further movement of the screw and unite the extremities of the band. Inasmuch as a portion of the torsion produced in the band yet remains, this torsion will exert a constant but elastic action, tending to turn the screw still further in the direction in which it turns while entering the nut, and by thus causing the shoulders $a'$ $c'$ to be continually pressed upon or against each other secures the permanence of the two sections of the coupling in position, and effectually precludes any tendency on the part of said sections to be turned in a reverse direction by any of the conditions or contingencies incurred during the operation of the band—as, for example, in transmitting power to or from grooved pulleys, or in the performance of any other function to which endless bands, or those capable of torsion, in the manner described, may appropriately be applied.

What I claim as my invention is—

The combination, substantially as herein set forth, of the coupling-section B, furnished with the threaded bolt $b$, with the female section C, and the cord or tube A, the latter being subjected to torsion while the sections are in position to connect, substantially as herein set forth, and for the purpose specified.

WALTER S. JARBOE.

Witnesses:
 FRED. HAYNES,
 A. B. McNIEL.